US007387057B2

(12) United States Patent
Dedeken et al.

(10) Patent No.: US 7,387,057 B2
(45) Date of Patent: Jun. 17, 2008

(54) LONGITUDINAL SLITTER FOR MOVING WEB

(75) Inventors: Ralf Dedeken, Düsseldorf (DE); Armin Hutzenlaub, Wiehl (DE); Dietmar Kunkel, Wiehl (DE)

(73) Assignee: Kampf GmbH & Co. Maschinenfabrik, Wiehl (DE)

( * ) Notice: Subject to any disclaimer, the term of this patent is extended or adjusted under 35 U.S.C. 154(b) by 111 days.

(21) Appl. No.: 10/546,346

(22) PCT Filed: Jan. 17, 2004

(86) PCT No.: PCT/EP2004/000334

§ 371 (c)(1), (2), (4) Date: Aug. 18, 2005

(87) PCT Pub. No.: WO2004/073943

PCT Pub. Date: Sep. 2, 2004

(65) Prior Publication Data

US 2006/0162521 A1 Jul. 27, 2006

(30) Foreign Application Priority Data

Feb. 19, 2003 (DE) ................................ 103 06 858

(51) Int. Cl.
*B23D 19/00* (2006.01)

(52) U.S. Cl. ........................... 83/498; 83/425.4; 83/433; 83/482; 83/504; 83/508.1

(58) Field of Classification Search ................... 83/469, 83/428, 507, 479, 482, 503, 498–499, 571–573, 83/562–563, 698.41, 504, 506, 508, 508.1, 83/433, 549, 425.3, 425.4, 864, 873, 618
See application file for complete search history.

(56) References Cited

U.S. PATENT DOCUMENTS

| | | | | |
|---|---|---|---|---|
| 3,332,326 | A * | 7/1967 | Haas | 493/363 |
| 3,974,727 | A | 8/1976 | Stehlin | |
| 4,116,098 | A * | 9/1978 | Suzuki et al. | 83/425.4 |
| 4,252,044 | A * | 2/1981 | Yamashita et al. | 83/499 |
| 4,261,239 | A * | 4/1981 | Toboshi et al. | 83/499 |
| 4,506,577 | A * | 3/1985 | Shinomiya et al. | 83/499 |
| 4,899,630 | A * | 2/1990 | Shioya et al. | 83/425.4 |
| 5,099,734 | A * | 3/1992 | Sugiyama et al. | 83/498 |
| 5,146,827 | A * | 9/1992 | Komatsu et al. | 83/482 |
| 5,435,217 | A * | 7/1995 | Kato et al. | 83/100 |
| 5,690,012 | A * | 11/1997 | Blandin et al. | 83/507 |
| 6,182,550 | B1 * | 2/2001 | Brewington et al. | 83/603 |
| 6,689,037 | B2 * | 2/2004 | Waldeck et al. | 493/355 |
| 2003/0217628 | A1 * | 11/2003 | Michalski | 83/425 |

FOREIGN PATENT DOCUMENTS

| | | |
|---|---|---|
| DE | 101 47 731 | 4/2003 |
| WO | WO 99/47317 | 9/1999 |

* cited by examiner

*Primary Examiner*—Boyer D. Ashley
*Assistant Examiner*—Laura M. Lee
(74) *Attorney, Agent, or Firm*—Andrew Wilford

(57) ABSTRACT

An apparatus for slitting a web moving along a path in a transport direction has a support transversely shiftable relative to the web adjacent the path, a drive shaft extending transversely of the direction adjacent the path and substantially nonmovable transversely of the path, and a drive gear on the support rotationally coupled gear to the drive shaft and shiftable along the shaft. A mount shiftable toward and away from the shaft on the support carries at least one driven gear and a driven blade fixed to and rotatable with the driven gear. Another blade is juxtaposed with the driven blade and flanks the path therewith. An actuator can shift the mount between a cutting position with the blades closely juxtaposed and the driven gear meshing with the drive gear and a retracted position with the blades separated and the driven gear out of mesh with the drive gear.

7 Claims, 4 Drawing Sheets

LONGITUDINAL SLITTER FOR MOVING WEB

CROSS REFERENCE TO RELATED APPLICATIONS

This application is the US national phase of PCT application PCT/EP2004/000334, filed 17 Jan. 2004, published 2 Sep. 2004 as WO 2004/073943, and claiming the priority of German patent application 10306858.9 itself filed 19 Feb. 2003, the entire disclosures of which are herewith incorporated by reference.

FIELD OF THE INVENTION

The invention relates to a longitudinal cutting apparatus for slitting a moving web and having at least one slide that can be positioned along a guide extending transversely of a web-travel direction and that has a mount for a freely rotatable upper blade, in particular a disk blade, movable toward a lower blade and drivable by a shaft that extends across the entire working width of the apparatus and that is rotated by a drive.

BACKGROUND OF THE INVENTION

A longitudinal cutting apparatus for paper, plastic foils, or aluminum foils normally has several pairs of disk blades, the blade pairs slitting the workpiece web longitudinally into individual strips. Such a longitudinal cutting apparatus is part of a winding machine that produces individual narrow rolls from a wide material web. In order to produce different roll formats, the disk-blade pairs are positionable transversely of the web-travel direction.

Such a longitudinal cutting apparatus is known from WO 1999/047317. The there described longitudinal cutting apparatus is comprised of a driven upper blade and a freely rotatable lower blade. The upper blade is a disk blade and the lower blade is a cup blade. Each pair of blades is positionable transversely of the travel direction of the web to be slit to produce the desired format width. In addition each upper blade is positionable along its rotation axis toward the respective lower blade so that the two blade edges can be exactly aligned to each other. Furthermore each upper blade can be raised to an inactive position if it is not needed for longitudinal slitting.

The rotary drive for the upper blade is an electric motor, in particular a compact brushless direct-current motor. The motor is mounted above the upper blade and drives the upper blade via a belt. The provision of the drive motor above the disk blade makes it possible to make the longitudinal cutting apparatus narrower.

U.S. Pat. No. 3,974,727 describes a cutting apparatus with rotatably driven blades for fashion cutting of cardboard sheets. The cutter of the cutting apparatus is comprised of two separately driven disk blades that are driven by a drive and a shaft extending over the entire width of the machine. For setting the cutting positions of the cutting apparatus the slides are shiftable transversely of the drive shaft. To set the cutting depth the disk blades are pivotal about the axis of the driving gear, to which end the gears of the drive are in constant mesh.

OBJECT OF THE INVENTION

The object of the invention is so to improve on a longitudinal cutting apparatus of the type of German patent 101 47 731 (also WO 2003/028961) that the gear driving the disk blade can be decoupled from the drive so that each disk blade can be individually stopped.

SUMMARY OF THE INVENTION

This object is achieved in that an angle between a line extending between centers of a gear on the drive shaft and of a gear meshing with it and the adjustment direction of the upper blade is between 60° and 120°.

With adjustment according to the invention through an angle between 60° and 120° formed between a line extending between centers of a gear on the drive shaft and of a gear meshing with it and the adjustment direction of the upper blade it is now possible to disconnect the gear driving the disk blade from the transmission. This has the advantage that only those blades that are actually cutting are coupled with the driving gear and that only these disk blades that are taking part of the slitting operation are driven, The unused blades and their bearings are spared and wear is minimized. At the same time the motor driving the drive shaft can be of lesser horsepower, so that the efficiency of the equipment is improved.

BRIEF DESCRIPTION OF THE DRAWING

In the following the invention is more closely described with reference to the drawing. Therein.

SPECIFIC DESCRIPTION

A longitudinal cutting apparatus for paper, a plastic foil, and aluminum foil normally has a row of blade pairs, the blade pairs cutting the web longitudinally into individual strips.

Such a longitudinal cutting apparatus is part of a winding machine that produces individual narrow rolls from a wide material web. In order to produce different roll formats, the disk-blade pairs are positionable transversely of the web-travel direction.

The blade pair of prior-art such machines is normally comprised of an upper blade, in particular a freely rotatable disk blade that is driven by the material web and a driven lower blade, in particular a cup blade or a grooved shaft having cutting flanks. Rotating the upper blade faster than the lower blade would make it possible to produce an advancing cut.

Figure 1:
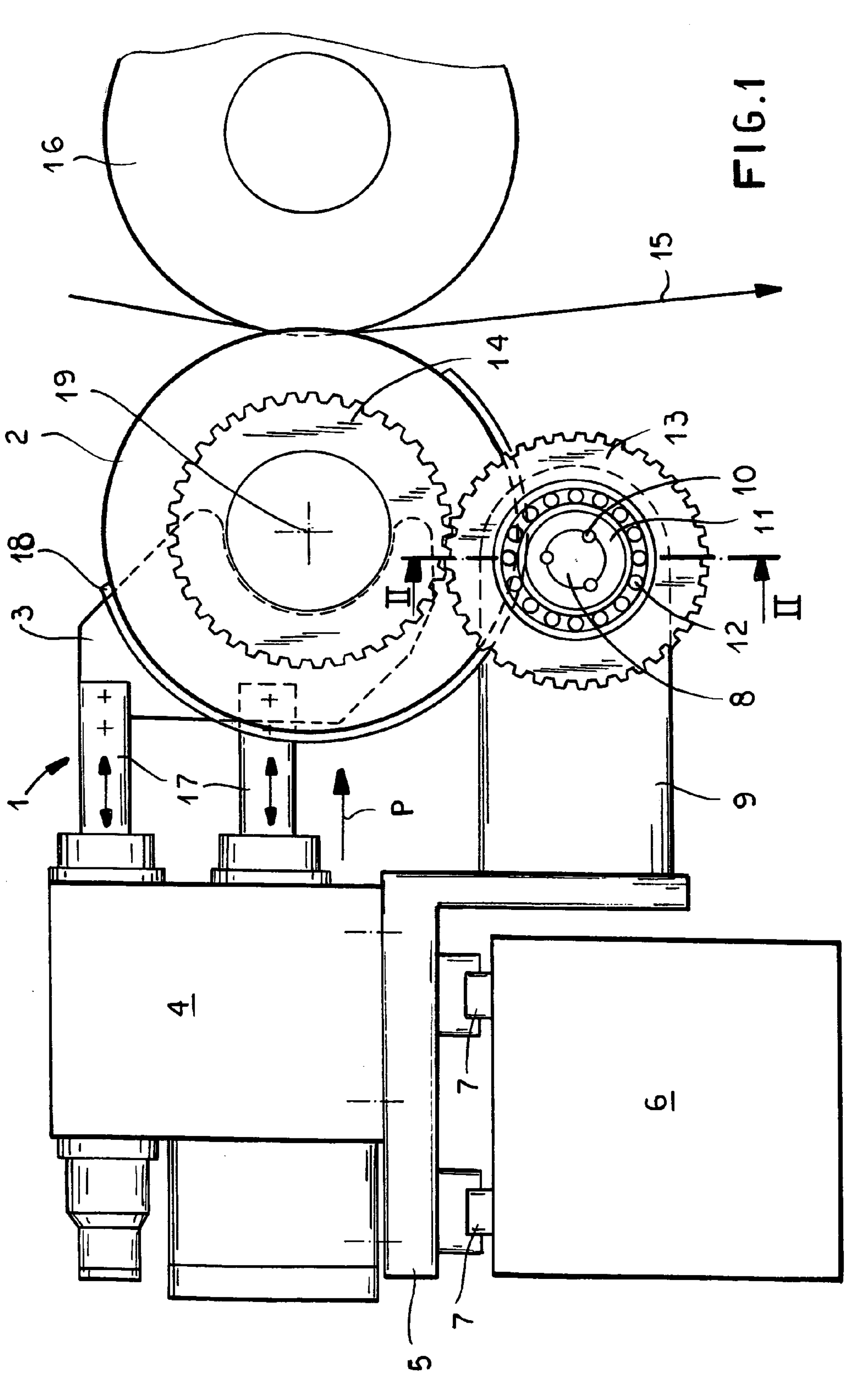
FIG. 1 shows the basic elements of a longitudinal cutting apparatus with a gear transmission for driving the disk blade.

FIG. 1 shows the longitudinal cutting apparatus 1 with a gear transmission. The longitudinal cutting apparatus 1 comprises an upper blade 2, in particular a disk blade, and, mounted on a respective blade support 4, a mount 3 for the disk blade 2. The individual blade support 4 is releasably mounted on a slide 5. The slide 5 in turn is mounted for longitudinal sliding on longitudinal guide rails 7 fixed on a support beam 6. A drive shaft 8 for the disk blade 2 is journaled in an outrigger 9. The outrigger 9 in turn is connected to the slide 5. The drive shaft 8 is angularly fixed to transmit torque but axially shiftable in a sleeve 11 that is freely rotatable on the slide 5 and that carries a gear 13 driving the disk blade 2.

Figure 2:
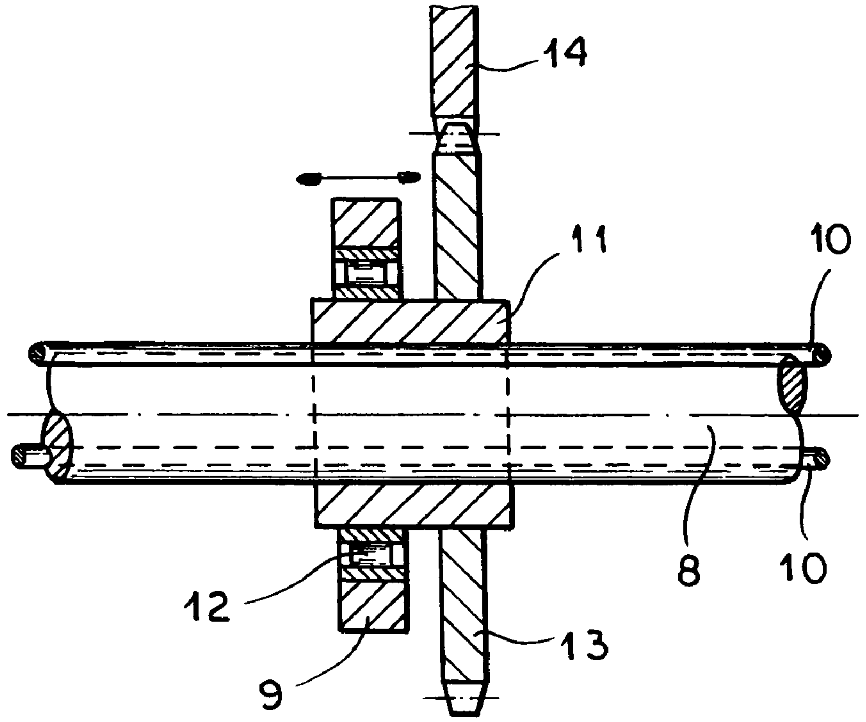
FIG. 2 is a section through the drive shaft and the gear transmission according to line II-II of FIG. 1.

The section of FIG. 2 through the mount of the drive shaft 8 and through the sleeve 11 and the outrigger 9 shows the drive of the disk blade 2. The sleeve 11 is rotationally fixed but axially shiftable on the drive shaft 8 and this sleeve 11 is rotationally fixed to the inner race of a bearing 12. The outer race of the bearing 12 in turn is fixed in the outrigger 9 so that the sleeve 11 can rotate relative to the outrigger 9 and the outrigger 9 and sleeve can slide axially along the shaft 8. The gear 13 driving the disk blade 2 is fixed to the outer surface of the sleeve 11.

To set the position of the disk blade 2, the sleeve 11 is axially shifted along a longitudinal profile and/or integral entrainment elements 10 of the drive shaft 8. The drive shaft 8 thus can be profiled, for example as a polygonal-section shaft, or can be provided with fixed entrainment elements 10, for example grooves, keyways, or ball guides as for example used in longitudinal guides. It is also possible to use a combination of a profile and the entrainment elements 10 on the drive shaft 8. Torque is transmitted from the drive shaft 8 to the sleeve 11 and thence to the gear 13. This gear 13 in turn meshes with a drive gear 14 of the disk blade 2.

As shown in FIG. 1 a material web 15 runs between the disk blade 2 and a lower blade 16 that are positioned relative to each other to produce a neat cut. Guide elements 17 move a cutting edge of the disk blade 2 against a cutting edge of the lower blade 16. To position the disk blade 2, the guide elements 17 can travel about 20 to 30 mm radially relative to the lower blade. During radial approach of the disk blade 2 to the lower blade 16 in the direction of arrow P the axial spacing between an axis of the drive shaft 8 and an axis 19 of the disk blade 2 is changed. The position variation is so minor that it does not influence meshing of the gears.

Figure 4:
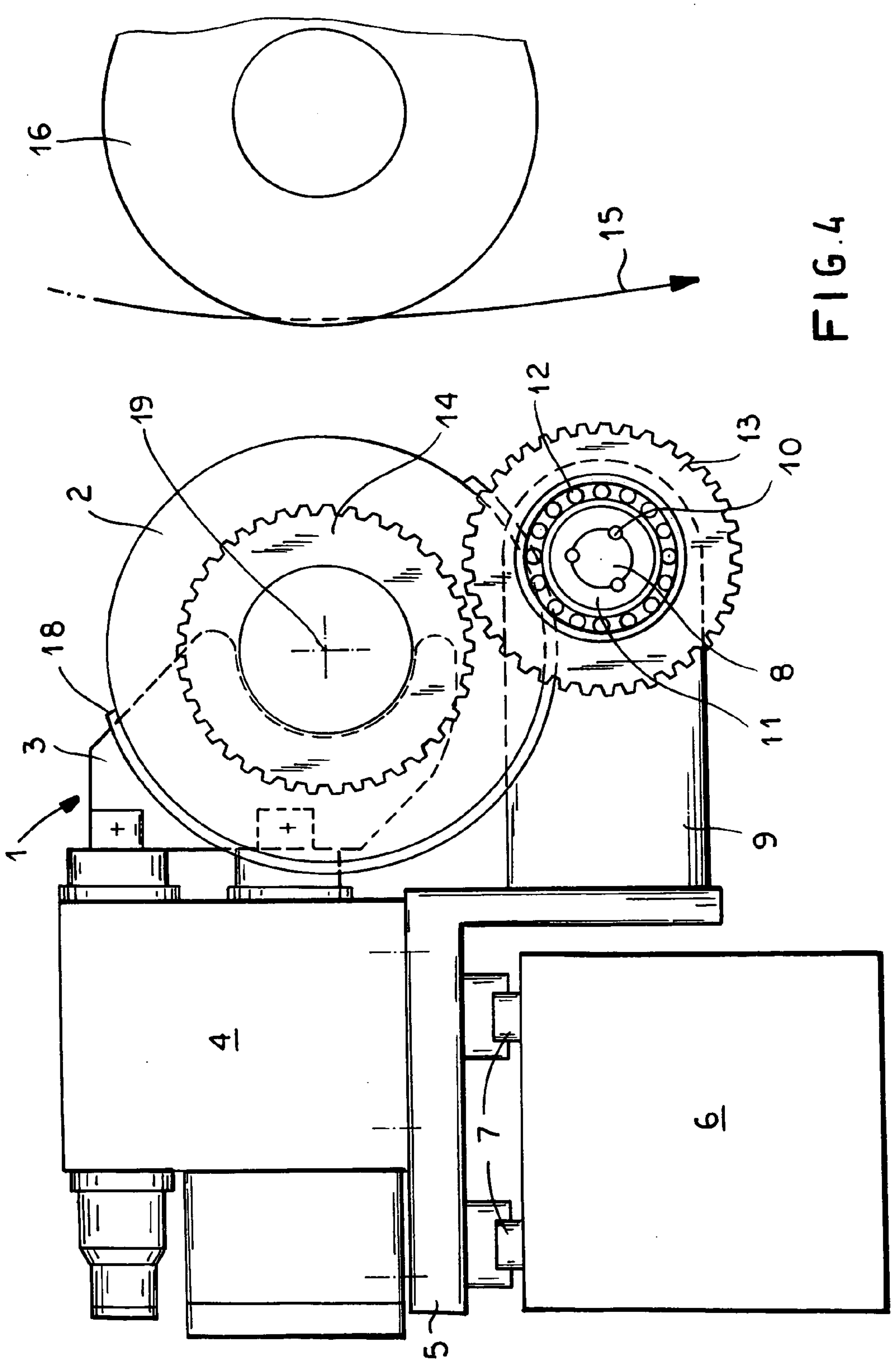
FIG. 4 is a view like FIG. 1 showing the longitudinal cutter in the retracted position.

Travel of the disk blade 2 out of the cutting position, opposite the direction P, pulls the driven gear 14 out of mesh with the drive gear 13 as shown in FIG. 4. The decoupling and coupling of the gears 13 and 14 is normally done when the shaft 8 is not rotating to avoid damage to the gears 13 and 14. Such movement of the disk blade 2 and the gear 14 fixed to it can take place with no clashing because the gear 14 and the blade 2 are freely rotatable in the mount 3.

Once the blade 2 is coupled up and positioned against the lower blade 16, the disk blade 2 is moved along with the gear 14 axially against the lower blade 16 until the blade 2 and the lower blade 16 engage each other for shear action. An extra protective guard 18 is provided around the disk blade 2.

Figure 3:
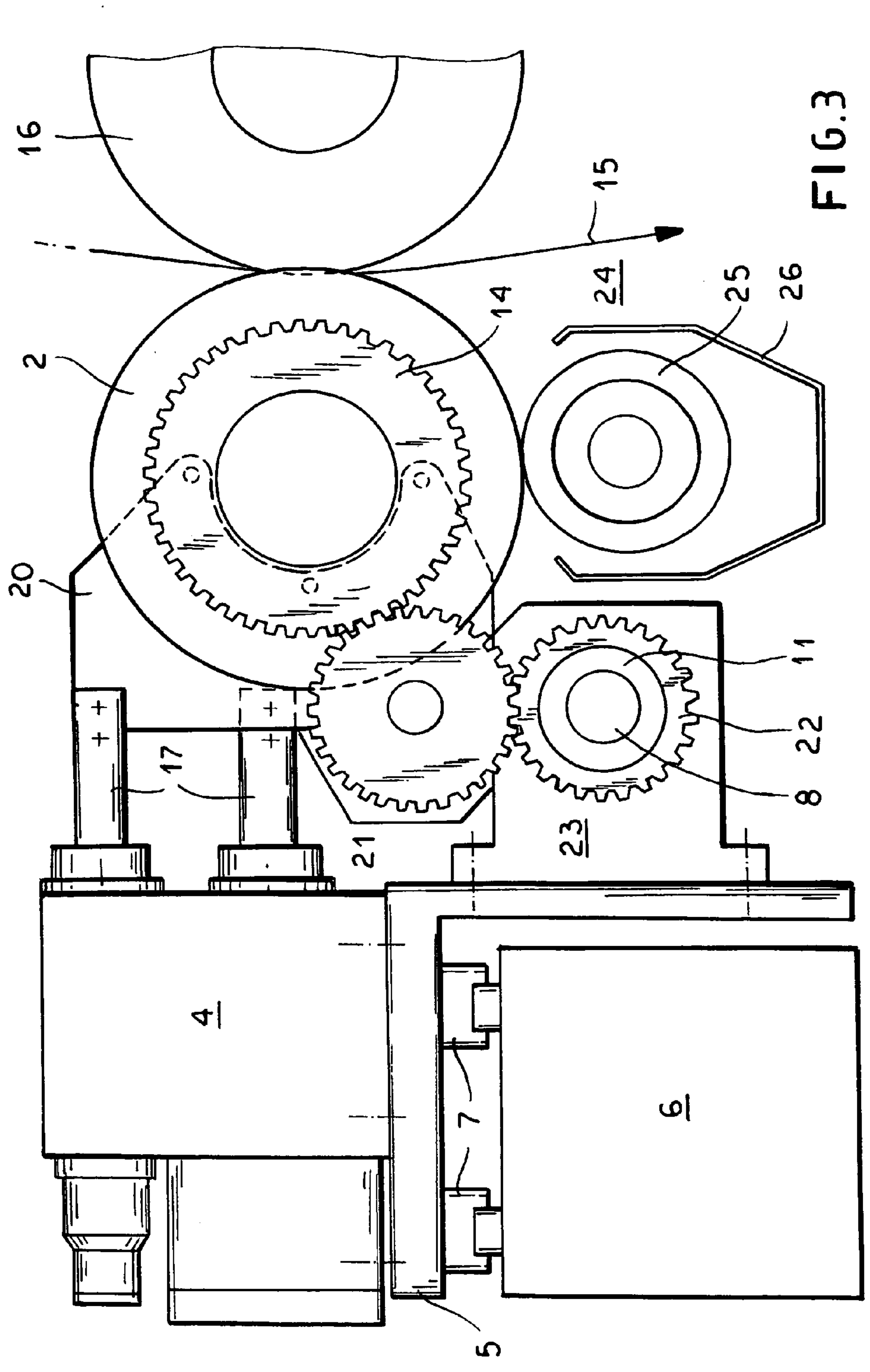
FIG. 3 shows the main parts of a longitudinal cutting apparatus with a gear transmission for driving the disk blade.

A preferred embodiment of the invention is shown in FIG. 3. The main elements of the longitudinal cutting apparatus are the same as described with reference to the FIG. 1 embodiment. A mount 20 for the disk blade 2 is somewhat different since it serves also to hold an intermediate gear 21. The intermediate gear 21 is driven by a gear 22 coupled by the sleeve 11 to the drive shaft 8. The drive shaft 8 is journaled close to the slide 5 in a short outrigger 23.

Providing the intermediate gear 21 in the drive train between the disk blade 2 and the drive shaft 8 and the position of the drive shaft 8 relative to the intermediate gear 21 leaves open a space 24 between the material web 15 and the short outrigger 23. This space 24 can be occupied by a temporarily positioned or permanently mounted device for grinding or cleaning the disk blade 2. This makes removal of the disk blade 2 easier.

If the disk blade 2 is used for example to slit a coated material web 15, for example adhesive-coated tape, the blade 2 can get fouled. A device that is provided in the space 24 can be formed as a circular disk 25 of felt. The felt disk 25 serves for cleaning the blade 2 and can be pressed against the blade 2.

To load in the material web 15, the disk blade 2 and the intermediate gear 21 are pulled by the guide elements 17 toward the respective blade holder 4. As this happens the gears 21 and 22 remain in constant mesh. Once the material web 15 is in place the guide elements 17 push out the mount 20, the blade 2, and the intermediate gear toward the lower blade 16. Torque is transmitted from the drive shaft 8 to the gear 22 and thence through the intermediate gear 21 to the gear 14 of the disk blade 2. The gear 14 is fixed to the disk blade 2 and journaled in the mount 20. Such movement of the disk blade 2 is initially radially of the lower blade 16 and thereafter axially parallel to the movement direction of the slide 5 relative to the lower blade 16 to form a shear system. The driven blade 2 has the advantage that it advances the cut which has a positive effect on the quality of cut the material web 15.

When a coated material web 15, such as adhesive-coated tape, is being cut, bits of the coating material adhere to the disk blade 24. The felt disk 25 in the space 24 can be pushed against the blade 2 and clean the blade 2 during the cutting operation. This reduces setup and maintenance time. Naturally, the felt disk 25 can also clean an unengaged disk blade 2.

In addition to cleaning the disk blade 2, the area 24 can also hold a permanently mounted device for sharpening the disk blade. A housing 26 is provided around the felt disk 25 to protect the felt disk and catch dirt or grind particles.

The invention claimed is:

1. An apparatus for slitting a web moving along a path in a longitudinal transport direction, the apparatus comprising:

- a support transversely shiftable relative to the web adjacent the path;
- a drive shaft extending transversely of the direction adjacent the path and substantially nonmovable transversely of the path;
- a drive gear on the support;
- means including formations on the shaft for rotationally coupling the drive gear to the drive shaft adjacent the support while permitting the drive gear to shift along the shaft;
- a mount shiftable toward and away from the shaft on the support;
- at least one driven gear carried and rotatable on the mount;
- a driven blade fixed to and rotatable with the driven gear on the mount;
- another blade juxtaposed with the driven blade and flanking the path therewith; and
- means connected between the mount and the support for shifting the mount between a cutting position with the blades closely juxtaposed and the driven gear meshing with the drive gear and a retracted position with the blades separated and the driven gear out of mesh with the drive gear.

2. The web-slitting apparatus defined in claim 1 wherein the mount is movable relative to the support in a direction forming with a line between a center of the drive gear and a center of the driven gear an angle equal to between 60° and 120°.

3. The web-slitting apparatus defined in claim 1, wherein the mount includes a sleeve rotationally coupled to but slidable along the drive shaft, the drive gear being fixed to the sleeve.

4. The web-slitting apparatus defined in claim 1 wherein there are two such driven gears in mesh with each other mounted on the support, one of the driven gears being coaxial with and fixed to the driven blade.

5. The web-slitting apparatus defined in claim 4, further comprising a tool engageable with the driven blade and mounted in a space between the web and the drive shaft.

6. The web-slitting apparatus defined in claim 5 wherein the tool is a cleaning tool.

7. The web-slitting apparatus defined in claim 1 wherein the other blade is freely rotatable and not driven.

* * * * *